United States Patent [19]
Kato et al.

[11] Patent Number: 4,891,784
[45] Date of Patent: Jan. 2, 1990

[54] HIGH CAPACITY TAPE DRIVE TRANSPARENTLY WRITES AND READS LARGE PACKETS OF BLOCKED DATA BETWEEN INTERBLOCK GAPS

[75] Inventors: Jeff J. Kato; David W. Ruska, both of Greeley; David J. Van Maren, Fort Collins, all of Colo.

[73] Assignee: Hewlett-Packard Company, Palo Alto, Calif.

[21] Appl. No.: 142,180

[22] Filed: Jan. 8, 1988

[51] Int. Cl.⁴ .................................................. G06F 3/06
[52] U.S. Cl. ................................ 364/900; 364/939.3; 364/952.6; 364/927.97
[58] Field of Search ... 364/200 MS File, 900 MS File; 370/60, 94

[56] References Cited

U.S. PATENT DOCUMENTS

| | | | |
|---|---|---|---|
| 4,040,026 | 8/1977 | Gernelle | 364/200 |
| 4,162,520 | 7/1979 | Cook et al. | 364/200 |
| 4,458,316 | 7/1984 | Fry et al. | 364/200 |
| 4,534,013 | 8/1985 | Sheth | 364/900 |
| 4,539,676 | 9/1985 | Lucas | 370/60 |
| 4,542,457 | 9/1985 | Mortensen et al. | 364/200 |
| 4,750,109 | 6/1988 | Kita | 364/200 |

Primary Examiner—Thomas M. Heckler
Attorney, Agent, or Firm—Edward L. Miller

[57] ABSTRACT

A tape packet assembler/disassembler (TPAD) for a tape drive accumulates host-transmitted records, which may or may not be blocked by the host. The accumulated host-transmitted records are combined into packets comprising a data portion made up of data blocks and a trailer portion made up of table entries describing how to disassemble the packet. Host-transmitted commands to write a tape mark are intercepted by the TPAD and replaced by corresponding information in the trailer. Packets are accumulated in a buffer in the TPAD, and are written to the tape drive when the buffer becomes full, or upon a command from the host to reposition the tape, such as rewind. The interblock gaps that would ordinarily separate the host-transmitted records now separate packets, resulting in a considerable increase in the efficiency of tape utilization. The TPAD maintains in the trailer various pointers to assist in forward and back spacing by file and records. It also can automatically and adaptively compress and decompress the user's data. To assist in this it also maintains in the trailer information identifying data blocks containing a dictionary reset.

1 Claim, 4 Drawing Sheets

CONTENTS OF AN ACCESS ENTRY

J, K, & L ARE BOOLEAN STATUS
FLAGS WHOSE MEANING ARE:

J = (AEOT) DATA BLOCK WAS WRITTEN AFTER EOT SENSED BY THE TAPE DRIVE

K = (COMP) DATA BLOCK USES DATA COMPRESSION

L = (RESET) DICTIONARY RESET ACCOMPANIES THIS DATA BLOCK

| BINARY VALUE | MEANING |
|---|---|
| 0 | DATA BLOCK REPRESENTS EXACTLY ONE COMPLETE HOST-TRANSMITTED RECORD |
| 1 | DATA BLOCK REPRESENTS A BEGINNING PORTION OF A HOST-TRANSMITTED RECORD, WHICH IS CONTINUED IN THE FIRST DATA BLOCK IN THE NEXT PACKET |
| 2 | DATA BLOCK REPRESENTS THE MIDDLE PORTION OF A HOST-TRANSMITTED RECORD, WHICH BEGAN IN A PRECEDING PACKET, AND WHICH IS CONTINUED IN THE FIRST DATA BLOCK IN THE NEST PACKET |

| BINARY VALUE | MEANING |
|---|---|
| 3 | DATA BLOCK REPRESENTS AN ENDING PORTION OF A HOST-TRANSMITTED RECORD, WHICH BEGAN IN A PREVIOUS PACKET |
| 4 | DATA BLOCK REPRESENTS A TAPE MARK TRANSMITTED BY THE HOST, AND IS NOT ASSOCIATED WITH ANY DATA, THE MARK ID FIELD SPECIFIES THE TYPE OF MARK |

LENGTH
46 { <BINARY VALUE> }  <BINARY VALUE> CONTAINS THE LENGTH IN BYTES OF THE ASSOCIATED DATA BLOCK

MARK ID
47 { <CODE> }  <CODE> SPECIFIES THE TYPE OR MEANING OF THE TAPE MARK, SHOULD MORE THAN ONE TYPE BE DEFINED FOR USE, EXAMPLES OF MARKS INCLUDE FILE MARK, END OF DATA, START/END OF VOLUME, ETC

HIGH CAPACITY TAPE DRIVE TRANSPARENTLY WRITES AND READS LARGE PACKETS OF BLOCKED DATA BETWEEN INTERBLOCK GAPS

BACKGROUND AND SUMMARY OF THE INVENTION

When data is written by a computer to a magnetic tape it is a common practice to separate portions of that data with erased sections of tape whose length is of an industry standard amount, such as three tenths of an inch, regardless of the length of tape in between that is required for the data. The empty sections are called gaps; more specifically, inter-record or interblock gaps, depending on the type of data separated by those gaps. Typically, a user's application program reads and writes logical records that are of a size determined by the application program. Because it has been recognized that it is wasteful of both time and tape to read and write individual application records separated by gaps (i.e., by inter-record gaps), it is customary for the operating system to collect consecutive application records into a buffer, from whence they are written by the host computer as entire blocks. These blocks of records are then separated by gaps, which are now called interblock gaps. (Depending on the nature of the storage medium, what corresponds to an interblock gap for half-inch nine track magnetic tape might be some other "record/block separator" such as a special pattern actually encoded on the medium.) The accumulation and writing process is called blocking; the corresponding reverse process of reading blocks from the tape, putting them into a buffer and then retrieving the individual records therefrom is called deblocking.

It is clearly seen that the efficiency of tape utilization is determined by the ratio between the amount of tape (between the gaps) used for data and the amount used for the gaps themselves. Since the amount of tape required for each gap is fixed by standardization, high efficiency of utilization requires that the amount of tape with data thereon between the gaps be large in comparison to the size of the gaps. However, it is common for the operating system of the host computer to put limits on the size of the buffer that may be used to perform blocking and deblocking. Furthermore, to change the size of the buffers may require both (1) changes in the application software and (2) changes to the operational configuration of, or in the actual code for, the operating system itself. Those who have attempted such alterations know that they can be an extraordinary aggravation.

Two recent trends in magnetic tape usage further aggravate the situation. The first of these in an increase in the bit density of the tape transport mechanism. A density of 6250 characters per inch (CPI) with a gap size of 3/10 of an inch for nine-track group-coded recording (GCR) tape drives is now an industry standard. Compared to an earlier standard of 1600 CPI and a gap size of 6/10 of an inch for phase encoding (PE) drives or to an even earlier one of 800 CPI and 6/10 of an inch for nonreturn-to-zero (NrZi) drives, GCR drives require considerably less tap to write a given record or block of records. This means that despite the increased density and an actual increase in the effective capacity of a reel of tape, the increased capacity comes at a price of decreased efficiency unless the degree of blocking can also be increased by a corresponding amount. As noted above, such changes to the environment in which the application program runs can be more trouble than living with the decreased efficiency of tape utilization.

The second trend is data compression. This has a similar effect by making the data itself require less tape. Since the degree of compression can often be quite dramatic, the unintended result of diminishing returns may arise as an increasing percentage of the tape becomes interblock gaps between smaller blocks of compressed data.

The full benefit in increased tape utilization for greater recording densities could be achieved if there were a mechanism for accumulating enough data before it is actually written to the tape. More than simple buffering of blocks into larger blocks is required, however, if such a process is to be invisible to existing operating systems and still write to tape using industry standard tape drives in a way that is in conformance with published standards.

Those objects are achieved by a tape packet assembler/disassembler (TPAD) located in the command and data path between the host computing environment and the tape drive. Host-transmitted records (whether blocked, compressed, both, or neither) are accumulated in a large buffer in the TPAD. Any characters in the data stream that serve as embedded delimiters of the structural features that have been blocked (e.g., a character whose meaning is end-of-record (EOR)) are left undisturbed, and re treated as ordinary characters. Tape commands, such as Write File Mark, are intercepted and replaced by embedded characters or by other information. Such "other information" can be of various types, and takes the form of tables of linkage information, plus information about the size of those tables. The usual interblock gap that would ordinarily occur on tape between host-transmitted records does not occur, as those records are accumulated into a new unit of tape motion: packets. Interblock gaps will now occur between packets.

Accumulation into the buffer begins at one end thereof and proceeds toward the other end, say, in the direction of increasing addresses. After a selected fractional amount of the buffer has been filled the linkage tables and their size information are appended to their associated data portion in the buffer. The linkage tables and size information is called a trailer. The data portion with its trailer is called a packet. Each packet is large enough to cause the writing of about a foot of tape for a 6250 CPI streaming tape drive. The buffer is large enough to hold, say, eight to twelve packets, depending upon configuration. Packets are written consecutively to the buffer until it is full.

The TPAD can, if needed, split an incoming host-transmitted record into segments stored in consecutive packets. This can happen either because the incoming record is larger than the packets, or because the amount of space remaining in the buffer is insufficient to contain the entire record. It must be remembered that the activities of the TPAD are to be transparent to the host computing environment, and that the TPAD has no way of knowing in advance the size of the next host-transmitted record. The TPAD cannot say to the host, "Hey, I ran out of room in my buffer. Take this record back, and send it to me again when I have more room." Insead, it has to hold the host off to prevent overrunning the buffer, and simply split the incoming record between two consecutive packets.

When the buffer is full all the packets therein are written out to tape, with the freed portions of the buffer available for the assembly and storage of new packets, even as the existing ones are still being written. If the host can keep up, then the TPAD may eventually have to hold the host off; otherwise, the host will fall behind, allowing the buffer to either become empty or simply partially filled. After each packet is written to the tape the tape drive will automatically write the usual interblock gap. If, after a gap is written, the buffer contains less than a packet, no further write operations occur, and tape motion ceases; otherwise, the writing of packets continues. Certain commands issued to the tape drive by the host affect the TPAD's packet assembly activities. A rewind command, for example, flushes to the tape any remaining contents of the buffer as a packet, so that the rewind can occur.

The writing of an entire packet of data between interblock gaps means that the efficiency of tape utilization is high. Writing as many consecutive packets as possible with uninterrupted tape motion assists in obtaining efficient use of streaming tape drives, although it will be appreciated that the practice of the invention is in no way limited to use with streaming drives. It may be used with equal satisfaction in conjunction with start-stop tape drives, and likewise is not limited to use with any particular recording technique, format or density. In particular, it will be appreciated that, even though the description that follows is offered in terms of a streaming 6250 CPI GCR drive with a nonmoving nine-track head, the invention may be used in conjunction with Digital Audio Tape formats (DAT) that employ a moving tape head and a physical record structure of fixed length. As will become apparent, the TPAD can perform its function with only minimal knowledge about the nature of the tape drive, does not need to be physically incorporated into the drive (although that may be desirable for various nontechnical reasons), and can, in general, treat the tape drive as a black box whose inner workings are largely mysterious.

To read the tape the process is essentially reversed. The tape drive is commanded to read a packet lying between two consecutive interblock gaps. No special command is needed to do this, as the tape drive knows nothing of a logical structure called packets. The TPAD simply commands the tape drive to read the next (physical) record on the tape; it just so happens that it is a pretty long record. (It's a packet probably containing an entire collection of block application records!) If it appears that there is room in the buffer for another packet then the next one is read, and so on, until the buffer is full. As the host sends commands to (attempt to) read physical records from the tape, the TPAD uses the information in the trailer for the current packet (and then the next packet, and so on) to disassemble the packets and send the original host-transmitted records (whether blocked or not) back to the host.

Special linkage information is maintained in the trailers to facilitate backspacing, forward spacing, and moves to the start or end of the present file, or to some file on either side of the present file. Other types of informatio can be kept in the trailer, also. The tasks of automatically compressing and decompressing the data, and the use of tape format specific tape marks to add structural features to the data recorded onto the tape (e.g., volume delimiters), are examples of things that can benefit from storing related information in the trailer.

In a preferred embodiment the TPAD incorporates the ability to compress the user's data before it is assembled into a packet. Data that is read from the tape is also decompressed upon the disassembly of packets. The preferred compression algorithm is one which uses a dictionary that is embedded in the compressed data stream. The preferred algorithm is adaptive, and can restart the process of dictionary building if the effectiveness of compression falls below a certain level. When the compression feature is in use certain additional trailer information is generated during packet assembly and later used during packet disassembly. The nature of this additional information will be separately described after the basic operations for packet assembly and disassembly without compression have been discussed.

Similarly, if the TPAD is to be used in conjunction with a DAT drive certain additional actions are desirable in the type of information maintained in the trailers for the packets.

DESCRIPTION OF A PREFERRED EMBODIMENT

Figure 1:
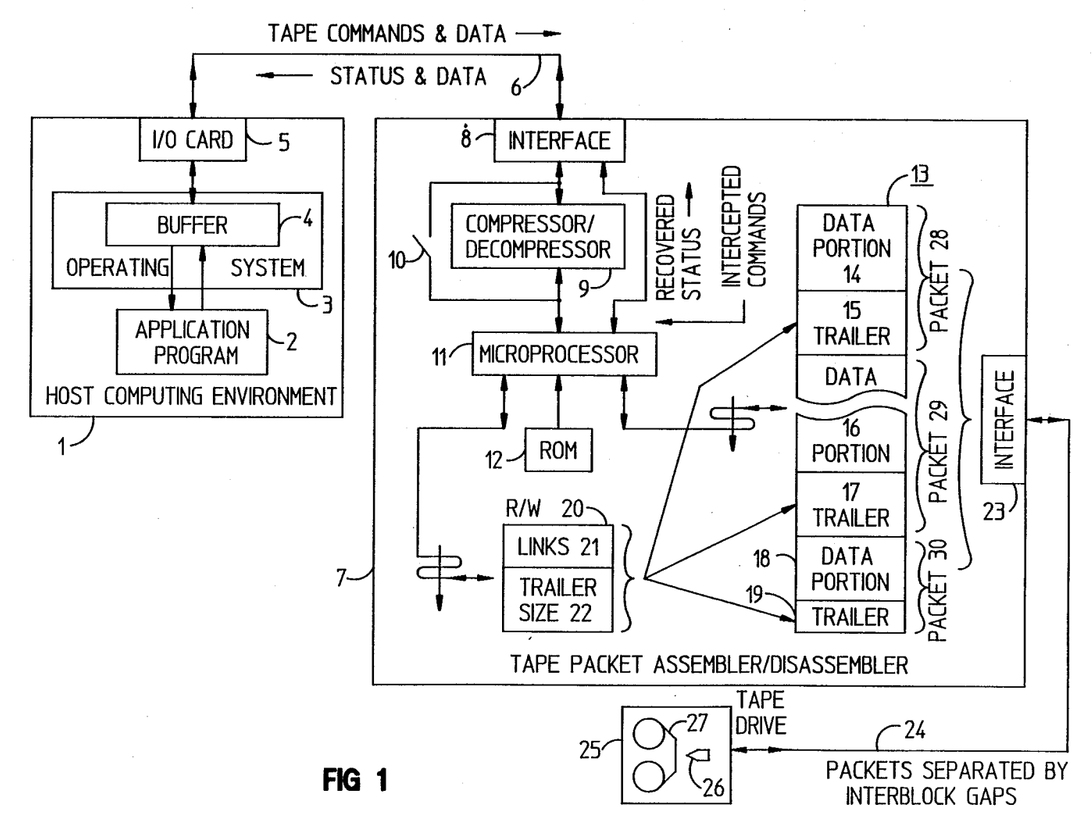
FIG. 1 is a simplified block diagram of a data processing system using a tape packet assembler/disassembler (TPAD) to control a tape drive in accordance with the invention.

Refer now to FIG. 1, which is a simplified block diagram of a host computing environment 1 coupled to a tape packet assembler/disassembler (TPAD) 7 for controlling a tape drive 25 in accordance with the principles of the invention. The host computing environment 1 runs an application program 2 that reads and writes data to and from a tape drive 25. An operating system 3 handles this communication by providing various services, such as making a collection of I/O commands available to the application program 2, management of the interrupt and DMA systems, and by providing a buffer 4 through which the data can be blocked and deblocked. Through the auspices of the operating system 2 data to and from the buffer 4 enters and leaves the host computing environment 1 via an I/O card 5, whose job it is (1) to electrically couple that data to a connecting cable 6, and (2) to perform low level handshaking with whatever device is at the other end of the connecting cable 6. As shown in FIG. 1, tape commands and data are transmitted over the cable 6 from the host computing environment 1 toward the tape drive 25, while data (and usually status information, too) are transmitted in the direction from the tape drive 25 toward the host computing environment 1.

FIG. 1 shows that a tape packet assembler/disassembler (TPAD) 7 resides between the hosts computing environment 1 and the tape drive 25. The TPAD 7 has two I/O ports. One of them is coupled by an interface 8 to the connecting cable 6 from the host computing environment 1. In this way the TPAD 7 is able to receive the tape commands and data being sent to the tape drive 25, and is further able to send to the host computing environment 1 the data read from the tape and any status information pertaining thereto. The other I/O port includes an interface 23 which receives a connecting cable 24 that is also coupled to the tape drive 25.

Over this connecting cable 24 travel (in both directions) packets that were/wil be separated on the tape 27 by interblock gaps. Thus, at the port that connects to the host computing environment 1, the TPAD 7 sends and receives data in the form that the operating system intended to transmit through the buffer 4. At the other port that is connected to the tape drive 25, the TPAD 7 send and receives data that has been assembled into packets whose corresponding length of tape is large in comparison to the size of an interblock gap. The principal task of the TPAD 7 is to convert the data arriving at each port into the format of the other port and send it out on that other port, all without either the host computing environment 1 or the drive 25 knowing about it.

To continue the overview, a brief summary of the inner workings of the TPAd 7 is as follows. When writing data to the tape drive 25, tape commands and data arrive at the interface 8, whereupon certain commands affecting tape motion (e.g., backspace, rewind) are extracted and sent directly to a microprocessor 11 that controls the operation of the TPAD 7 according to programs that reside in a Read Only Memory (ROM) 12. Various other commands (e.g., write a tape mark) are extracted from the data stream, encoded and integrated into the content of the packet; they are not allowed to reach the tape drive in their native form. When packets are ready by the TPAD the tape marks are recovered and the appropriate status information sent to the host, just as if it had come from the tape drive.

(A tape mark is a tape format specific condition written onto the tape that is distinguishable from data and recognizable by the tape drive. The reading of a tape mark is reported by the drive as part of the status information. The meaning of the tape mark is generally left up to the operating system. Each type of nine track tape format generally has only one type of tape mark, and its meaning is usage dependent. In principle, there is no reason why there cannot be several types of tape marks, each with its own individual meaning.)

The data/embedded-command-stream from the interface 8 is then either coupled to or routed around a compressor/decompressor 9. Path 10 with its switch is illustrative of the choice. In the case of data being sent to the tape drive 25 compressor/decompressor 9 would act as a compressor. The original or compressed data stream arrives at the microprocessor 11, whereupon it is sent directly into a selected portion of a buffer 13. In a preferred embodiment buffer 13 is rather large, say, eight bits wide and of about half a million addressable locations. Initially, the data will be loaded into a portion of the buffer 13 such as data portion 14. During this activity certain information about the nature of that data is stored in an area of Read/Write Memory (R/W) 20. This information includes various linkage information 21 and trailer size information 22 about how much information has been stored into R/W 20. When data portion 14 reaches a selected size the storage of data therein briefly ceases while the contents of R/W 20 is appended thereto to form the trailer 15. Together, the data portion 14 and trailer 15 form a packet 28. The process then resumes with the formation of another data portion 16 and the eventual appending of another trailer 17. That forms another packet 29.

Figure 2A:
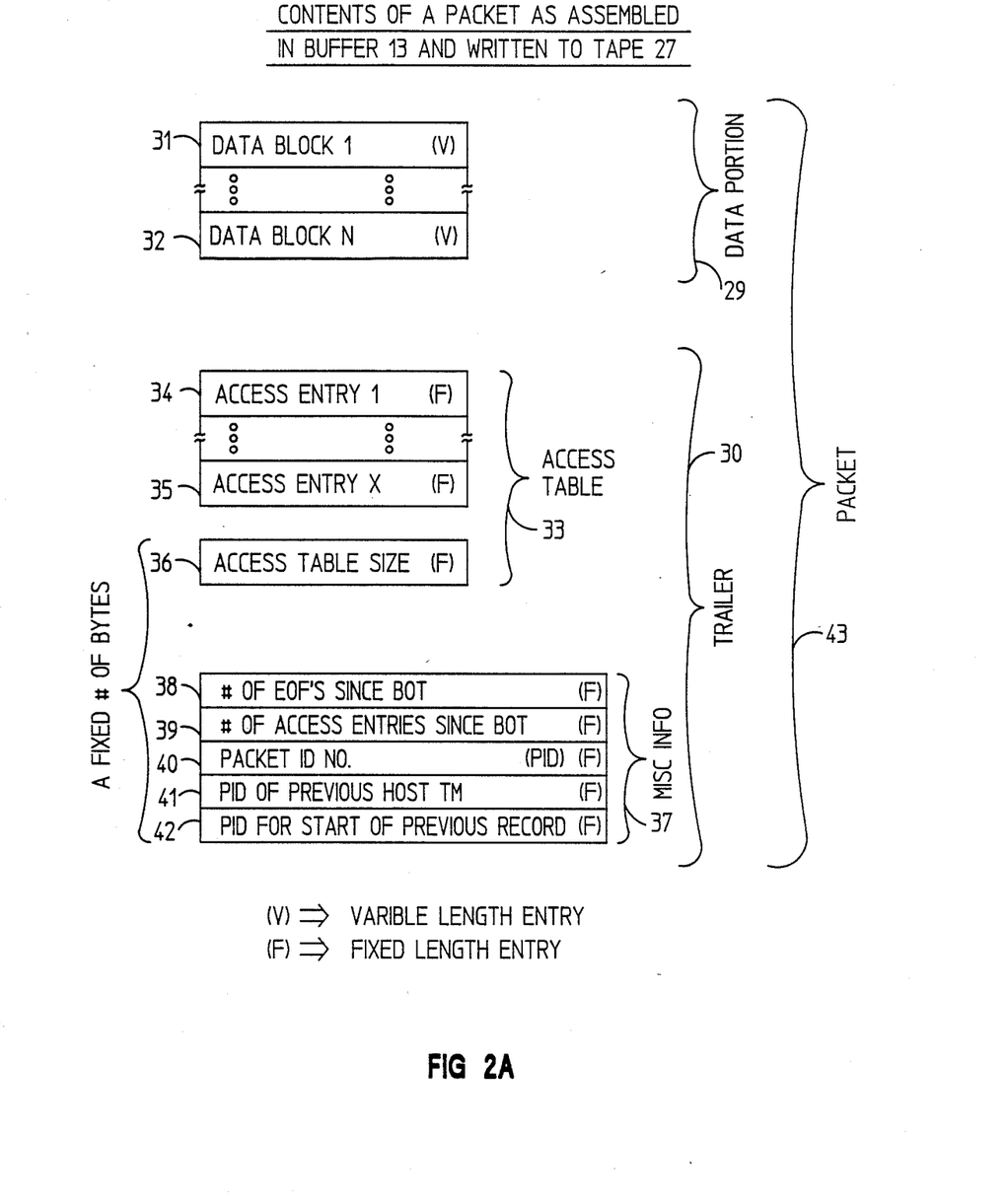
FIGS. 2A, 2B and 2C are a diagram illustrating in simplified form the basic data structure of a packet for the TPAD of FIG. 1.

At this point we digress briefly to illustrate the flexibility of TPAd operation in cooperation with various types of media formats. Not all sequentially accessed media accept records or blocks of arbitrary size. Some cassette tapes are preformatted like a disc, while DAT drives read and write fixed size frames separated by tape marks. The TPAD can accommodate these arrangements with ease. One special circumstance that arises is the occasional need to pad the length of an otherwise short packet to be long enough to occupy the required amount of space on the medium. This is not difficult, and may be done by simply separating the trailer 30 from the data portion 29 by a suitable amount of unused space in the buffer, rather than simply appending the trailer 30 to the end of the data portion 29. We now resume the main discussion.

Assuming that the host computing environment 1 continues to send data to the tape drive 25, the process of packet assembly described above continues until eventually the buffer 13 is full of packets. At that time the packets are sent via interface 23 and connecting cable 24 to the tape drive 25. As the tape drive 25 writes each packet it automatically follows it by an interblock gap. As packets are written to the tape drive 25 they are "removed" from the buffer 13, and their space is available for the assembly of additional packets. The process continues until there are no more complete packets available for writing to the tape drive 25. At that time the motion of the tape 27 ceases; the cycle just described begins again when the buffer 13 again becomes full. A tape motion command from the host computing environment (e.g., rewind) can force the completion of a packet and the transfer of a partially filled buffer 13, in order to allow the execution of the command.

When reading data from the tape drive 25 the TPAD 7 first ensures that the tape 27 is correctly positioned. Then it reads as many packets into the buffer 13are there is room for. To reconstruct the data to be sent to the host computing environment 1 the TPAD7 reads the trailer information for the earliest packet remaining in the buffer 13. This packet can be located because the TPAD 7 keeps track of where in the buffer 13 is the next available location for storing another packet, and continues to keep track of where it put each previously retrieved packet. It then uses the linkage information in the trailer of that earliest packet to disassemble that packet, decompress it if needed, and transmit the originally recorded data back to the host computing environment 1. Any tape marks embedded in the packet are recovered, and the appropriate status information sent to the host. Then the next packet is disassembled and sent to the host. When all the packets in buffer 13 have been disassembled, a new collection of packets is read from the tape drive 25, and the process continues.

We turn now to a more detailed explanation of how the data in a packet is organized. Referring to FIG. 2A, shown there is a simplified diagram of the data structure of a packet 43. The packet 43 is divided into two major parts; a data portion 29 and a trailer 30. The trailer 30 is in turn divided into two major parts; an access table 33 and a table of miscellaneous information 37. The various major parts include a variety of entries, each of which will now be discussed in turn.

The data portion 29 is composed of a number (N) of one or more data blocks 31, 32. These are of variable length, and represent the (possibly) compressed) host's (possibly blocked) records that were transmitted to the TPAD 7. The host's attempts to write tape marks (TM's) have at this point been intercepted and removed by the microprocessor 11.

It is important to distinguish between the data blocks 31, 32 and the actual host-transmitted records that reach TPAD 7. There is a correspondence between them, but it is not necessarily a one-to-one correspondence. First, there may be tape marks interspersed between the host-transmitted records. This is discussed in the next paragraph. Second, a data block that is to be part of a packet might not be large enough to contain an entire host-transmitted record, or, may contain a continuing portion of a host-transmitted record that is carried over from the preceding packet, or, may be the beginning of a host-transmitted record that the current packet has insufficient room to contain in its entirety. This second case is discussed in more detail somewhat further below, inconjunction with the explanation of FIG. 2B.

The access table 33 is composed of a number (X) of two types of entries. One type is a series of access entries 34, 35. There is one access entry (34, 35) for each data block and each attempt by the host to write a tape mark. That is, X is the sum of N plus the number of tape marks associated with data portion 29. Access entry type is distinguishable, as described below, and if associated with a data bock, will contain the size in bytes of the associated data block (31, 32). If an access entry represents the occurrence of a tape mark, then it contains a code that identifies that mark. The access entries 34, 35 occur in the same order that their associated data blocks (31, 32) and tape marks arose out of the actions of the host computing environment 1. The second type of entry in the access table 33 is a single entry containing the overall size of the access table 33. This entry is used in traversing the data structure of the packet 43 during disassembly, and is located a fixed number of bytes from the end of the packet.

The miscellaneous information portion 37 contains the following entries, each of which is maintained by the TPAD 7 as each packet is assembled for writing onto the tape 27. The first of these is entry 38, which contains the number of times the host has sent end-of-file (EOF) since the tape 27 was positioned at the beginning-of-tape (BOT). This allows the derivation of the file number that the host computing environment is currently concerned with, and is useful in error recovery. For instance, if upon reading the tape a section thereof is garbled, it is possible to indicate to the host how many files have been lost.

Entry 39 is similar to entry 38. It contains the number of hosttransmitted records plus tape marks (so far, as of this packet) since the beginning of the tape. That is, it contains the sum of the number of (type zero or one, as described below) data blocks 31, 32 (for all packets 43 on this tape to this point) plus the sum of the number of intervening tape marks. Entry 39 is also used in error recovery.

Entry 40 contains a sequential packet identification number (PID). For each tape the sequence starts at, say, one, and continues to increase by one for each consecutive packet written to the tape. This entry is maintained by the TPAD 7 as packets are assembled, and is used in positioning the tape during host induced tape motion, such as backspacing.

Entry 41 contains the PID of the most recent previous packet (if such there be) that contains a tape mark written by the host. This entry is used in responding to a backspace file command issued by the host. This is particlarly helpful, because the difference between the value of entry 41 and the current PID is the number of real gaps on the tape 27 that must be passed during a reverse motion to reach the packet containing the destination file. If the tape drive supports more than one type of tape mark i, ii, . . . (such as DAT does), then enty 41 would be divided into a plurality of corresponding entires, 41(i), 41(ii), . . . (not shown). In such a case entry 41(i) would contain the PID of the most recent previous packet that contains a host-written tape mark of type i, 41(ii) the PID of the most recent previous packet containing a tape mark of type ii, etc.

The last entry 42 in the trailer 37 is the PID (if it exists) of the previous packet containing the start of that host-transmitted record which precedes the first complete such record in this, the current packet. This piece of information allows the TPAD 7 to backspace the tape 7 by a (host's) record.

Figure 2B:
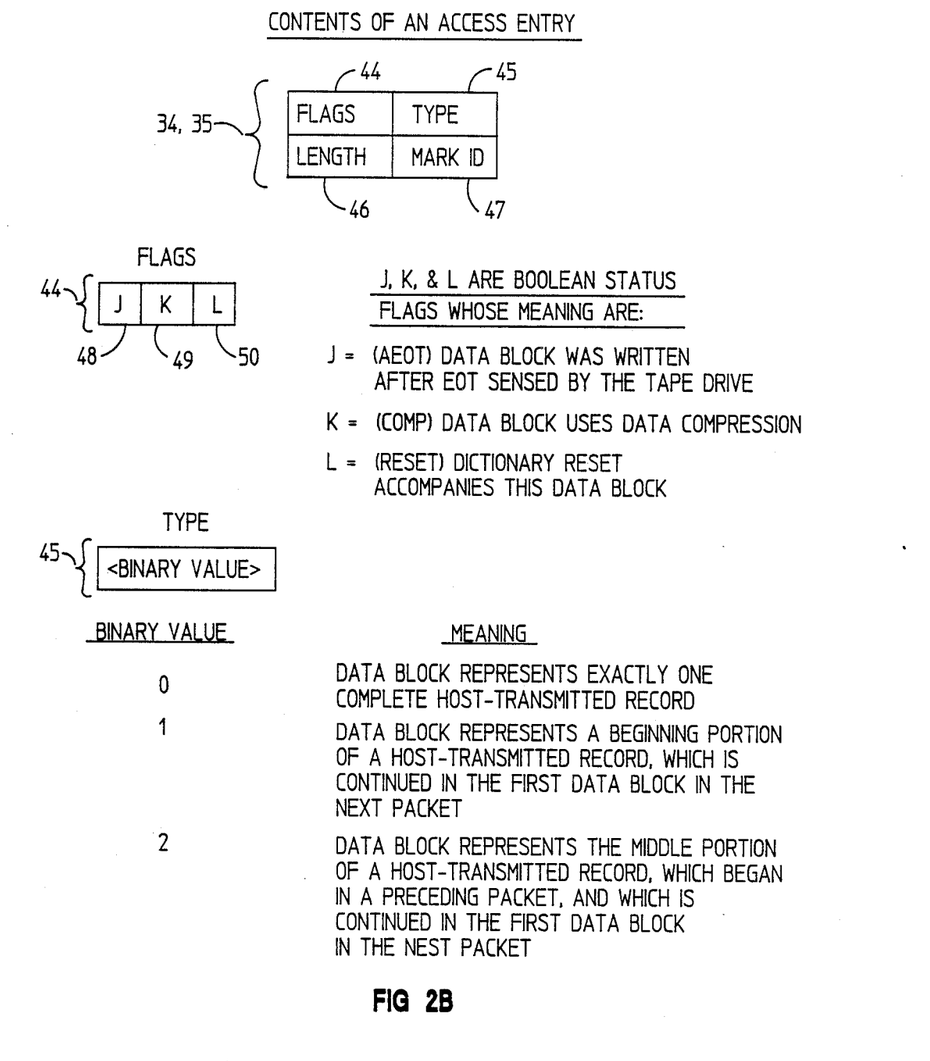
Figure 2C:
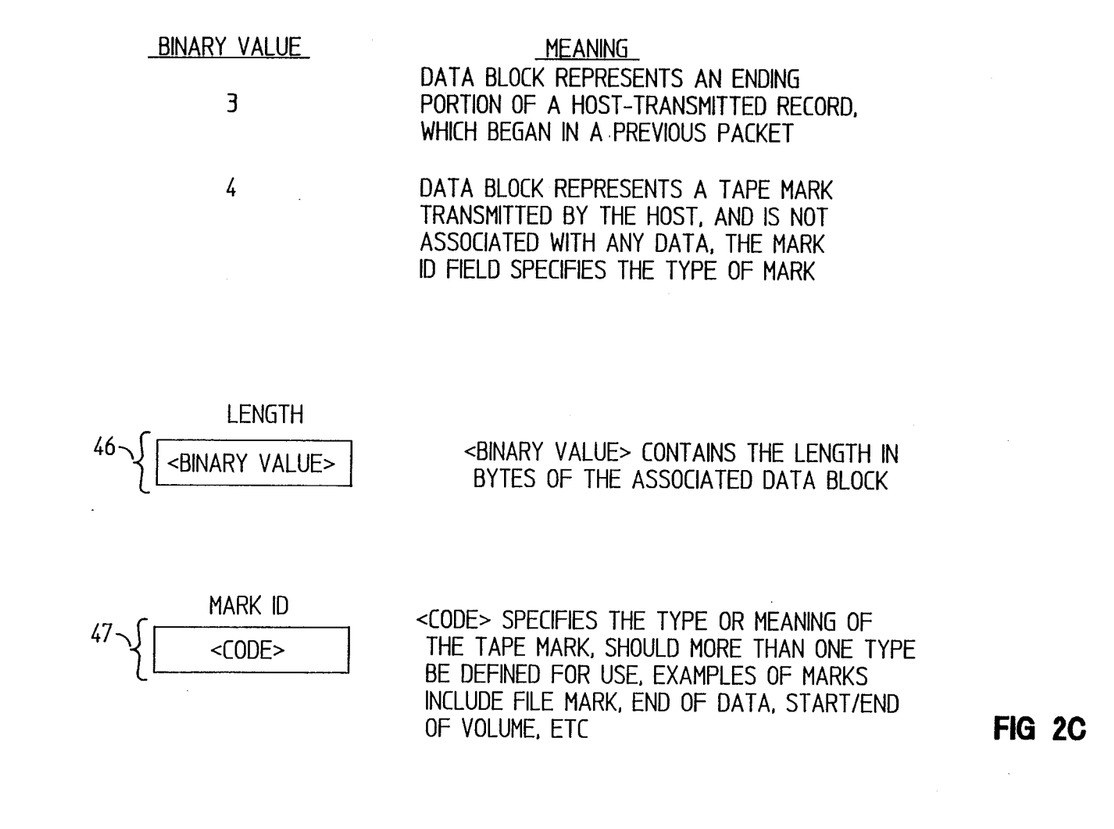

FIGS. 2B-C illustrate the various types of access entries that may arise. An access entry 34, 35 can contain four types of information located in fixed length fields 44, 45, 46 and 47. These fields are called FLAGS, TYPE, LENGTH and MARK ID, respectively.

The FLAGS field 44 contains three boolean flags J 48, K 49 and L 50 that may occur in any needed combination for the associated data block 31, 32. Flag J 48 indicates that the associated data block 31, 32 was written after the end-of-tape (EOT) mark was announced by the tape drive 25. (The EOT mark in nine track drives is generally a reflective surface attached to the nonmagnetic side of the tape 27, which is then sensed by the drive. A DAT drive keeps track of tape usage, and by dead reckoning simply declares EOT.) The J flag 48 allows the TPAD 7 to inform the host computing environment 1 that the current packet as reported at the time of writing to have been written at or beyond the end of tape. It is up to the host computing environment to take the hint, and not try to use more tape.

Flags K and L concern data compression. Flag K 49 indicates that the associated data block 31, 32 has been compressed by the TPAD 7. (Compression by the host computing environment is a mystery to the TPAD 7, which would proceed to treat the data as being uncompressed. Such circumstances cause no problems, but do not set flag K.) Flag L 50 indicates that the associated data block 31, 32 is one wherein the compression and decompression dictionary is restarted. We shall have more to say about compression, and about how flags K and L are used, in a later section.

The TYPE field 45 contains a binary value that indicates something about the relationship of the data block 31, 32 to other data blocks. A value of zero indicates that the associated data block 31, 32 represents exactly one host-transmitted record. When the size of the host-transmitted records is small with respect to the size of the packet, one can expect to find several consecutive type zero data bocks per packet. (Assuming, that is, that they are all a part of a large structure, such as a file, and are not separated by tape marks.)

A value of one in TYPE field 45 indicates that the associated data block 31, 32 represents a beginning or starting portion of a host-transmitted record, and that the entire record is not contained in the data block. This situation can arise in two ways. The first way is that there is only a little bit of room left in the packet, and that only a fraction of the next host-transmitted record can be included before the assembly of the current packet is concluded. The TPAD 7 must be prepared to do such splitting, even if it were prepared to try to make the packet a little larger (which is of dubious value; there is not necessarily a way to know how long the incoming record is going to be), since there is always the possibility that the last available room in the buffer 13 has been used. The second way is that the incoming host-transmitted record is simply too large to fit in any packet the TPAF 7 would care to assemble, no matter how big. We have, after all, not put any limits on how big the host-transmitted record can be! Either way, when a type one data block occurs, the next data block in the next packet receives the continuing portion of the incoming host-transmitted record. As we shall see with type two, it might not fit even there.

A value of two in the TYPE field 45 indicates that the associated data block 31, 32 represents a middle portion of a host-transmitted record. That record began in a preceding packet, and not necessarily in the immediately previous one, either, if the host-transmitted record is quite large. (The data block in the previous packet might have been of type two, also!) A type two data block consumes the entire data portion of the packet, since by definition it is a middle portion rather than an end or concluding portion. Hence, the next data block in the next packet is also associated with that same hosttransmitted record (although with a later portion thereof).

A value of three in the TYPE field 45 indicates tha the associated data block 31, 32 represents an end or concluding portion of a host-transmitted record that did not fit into the previous packet. The previous data block must have been of type one or two, and if of type two, then the previous data block must have been of type one or two, and so on, until the chain began with a type one.

The LENGTH field 46 contains a value that specifies thelength in bytes of the associated data block 31, 32.

The MARK ID field 47 contains a code that specifies the type or meaning of any tape marks that the host computing system 1 attempted to write to the tape 27. As previously explained, these are intercepted by the TPAD 7 and replaced with corresponding access entries 34, 35.In the logical structure by which the packet is assembled and disassembled, these special access entries occur in between the data blocks 31, 32, just as the tape marks transmitted by the host delimit the surrounding host-transmitted records. Nine track half-inch tape typically has only one meaning for a tape mark, and it is usually end-of-file (EOF). Accordingly, those tape drives write and recognize only one mark. It is certainly conceivable that a tape drive might write and recognize several different tape marks, each of which would have its own meaning. To accommodate the various different tape marks that might occur with such a multi-mark tape drive is why the MARK ID field 46 is wide enough to accept a code, rather than a simple one-bit flag. The meanings and usage of any such plurality of tape marks is, of course, format and tape drive dependent, and need not be discussed in any detail here, save to offer some possible examples of what such marks might be. Such marks might include, but would not be limited to, end-of-file marks, end-of-data marks, start/end-of-volume marks, start/end-ov-volume marks, and so forth.

ADDITIONAL CONSIDERATIONS SURROUNDING COMPRESSION

The remarks below pertain to the operation of TPAD 7 when it is instructed to automatically compress the host-transmitted data before sending it to the tape drive 25. It follows, of course, that the TPAD must then also decompress that data after it has been read from the tape 27 and restore it to normal before sending it back to the host computing environment.

The type of compression that the TPAD performs is of the type wherein the dictionary is embedded in the stream of the compressed data. The compression mechanism is adaptive, and if the compression ratio falls below a certain value (say, because the type of data changed from binary to ASCII), the compression algorithm starts over with a new dictionary. Also, any compression performed on the data by the host computing environment prior to the sending to the TPAD 7 of the host-transmitted records is unknown to the TPAD, and is of no interest. Such pre-compressed data would be treated as any other data to be compressed.

Generally speaking, the compression algorithm starts over with the assembly of each new packet. There is an exception to this which occurs when the first one or more data blocks in a packet are associated with a host-transmitted record that began in a preceding packet. In that case those initial data blocks in the packet are compressed according to the previous dictionary in use. (However, because of the adaptive nature of the compression algorithm there may be chance be an adaptation-induced dictionary reset for the first data block in a new packet belonging to the exception stated above.) Actually, because of the way the buffer 13 is managed, the exception can be expected to occur rather regularly. So the rule is that for each packet a dictionary reset occurs for the first data block therein which is associated with the first hosttransmited record actually transmitted at or after the beginning of the assembly of the packet. That is data blocks having a type of zero or one will force a dictionary reset when they are the first such data block in a packet, but types two and three will not force a reset (although one might occur adaptively, as described above).

IF the TPAD were to restart the dictionary with every data hosttransmitted record (i.e., with every type zero or type one data block) then the amount of complexity needed in the TPAD to compress and decompress would be reduced somewhat. But that would come at the expense of being able to maintain the best possible compression ratio. If the data in the successive hosttransmitted records were quite homogeneous, then it would be wasteful to restart the dictionary unnecessarily. Thus it is desirable for the TPAD to allow the use of a dictionary that spans a multiplicity of host-transmitted records, leaving dictionary resets to the control of a compression performance monitor and to the start-of-packet rule stated above. This is indeed the case in the preferred embodiment. However, there are some consequences that must be dealt with.

The main consequence is that data blocks must be decompressed in sequence, beginning with one that contains a dictionary. This is not a problem if the entire tape (or at least some entire initial portion thereof) is read (and also decompressed) to retrieve the data that is of interest. But consider a case where a selective retrieval is attempted. Suppose the user has maintained a directory at the beginning of the tape (it's a lot of trouble, and not without risk, but people do it anyway), or that he otherwise knows that what he wants to read is the ninety-seventh host-transmitted record. The user is no respecter of the TPAD's woes in trying to decompress something whose dictionary starts some arbitrary place ahead of the ninety-seventh host-transmitted record, which is in who knows which packet, anyway. The user simply says, FORWARD SPACE 97; READ! So now what?

Here is how this situation is handled. The TPAD 7 reads forward from the beginning of the tape, inspecting the packets as it goes. What it is looking for is the start of the ninety-seventh host-transmitted record. To do this it counts the number of access entries of type zero or one. When it finds the desired data block, it need not look any further back that the start of the packet it finds itself to be in to find a dictionary and data block that can be used to begin decompression. Why needn't it wory about having to go outside the present packet? Because ever packet "starts" with a dictionary unless the continuing record exception applies. And the exception won't apply, because we are looking for the start of record ninety-seven, not its third middle part. So, when we find the start of record ninety-seven in a packet, we know that either it or an earlier data block in that packet has a dictionary restart associated therewith.

Once the packet with the needed dictionary restart is in the buffer it is a simple matter to begin decompressing at that point, even if it is ahead of the place in the data where the user wishes to begin reading. If that should be the case the TPAD simply sends the intervening decompressed data into the "bit bucket" until it gets to the place in the data where the user asked to start. To do this the TPAD 7 looks for the L flag 50 in the FLAGS portion 44 of the access entries 34, 35 that are part of the trailer 30 of a packet 43. As the TPAD is hunting forward through the tape looking for the ninety-seventh host-transmitted record it keeps track of where the most recent L flag occurred. In that way the TPAD knows were to start decompression with a restarted dictionary, which might be on the eighty-fourth host-transmitted record.

We claim:

1. Apparatus for assembly and disassembly of packets of data communicated between a host computing environment and a sequentially accessed mass storage device, the apparatus comprising:

first interface means for coupling to the host computing environment, for receiving host-transmitted records to be written to the mass storage device, and for sending to the host computing environment data and status information read from the mass storage device;

packet assembly/disassembly means coupled to the first interface means for assembling into a buffer packets comprising data portions and trailer portions of information corresponding to host-transmitted records, the data portions containing data from the host-transmitted records and the trailer portions containing descriptive information about the structure of the data portions, including the location of any tape mark that occurred in the host-transmitted record, and for disassembling back into host-transmitted records and associated status indications packets comprising data portions and trailer portions; and second interface means coupled to the packet assembly/disassembly means for coupling to the mass storage device, for writing packets in the buffer thereto, and for reading packets therefrom into the buffer.

* * * * *